(No Model.)
F. HABERMAN.
SLOP JAR COVER.
No. 397,425. Patented Feb. 5, 1889.
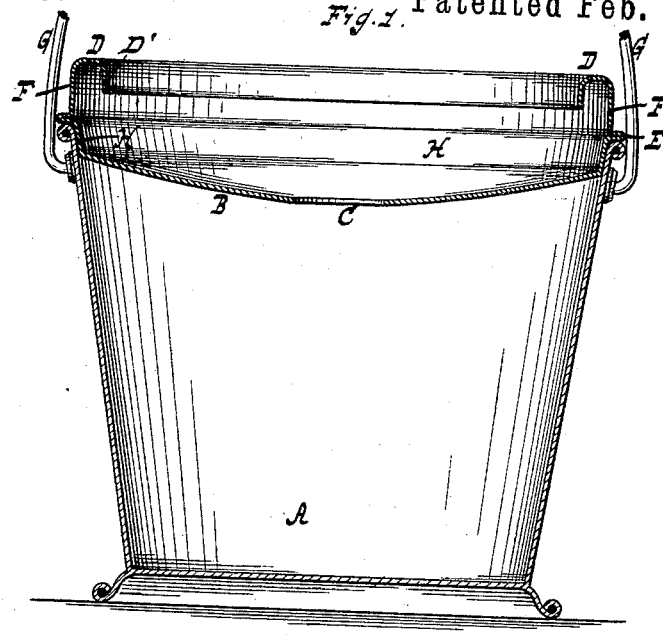
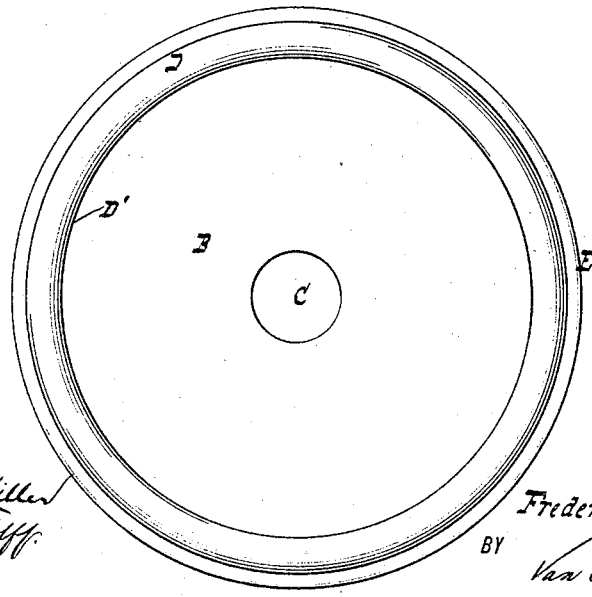
WITNESSES:
William L. Miller
Edward Wolff
INVENTOR:
Frederick Haberman.
BY
Van Santvoord & Hauff
ATTORNEY
N. PETERS, Photo-Lithographer, Washington, D. C.

UNITED STATES PATENT OFFICE.

FREDERICK HABERMAN, OF NEW YORK, N. Y.

SLOP-JAR COVER.

SPECIFICATION forming part of Letters Patent No. 397,425, dated February 5, 1889.

Application filed November 15, 1888. Serial No. 290,905. (No model.)

*To all whom it may concern:*

Be it known that I, FREDERICK HABERMAN, a citizen of the United States, residing at New York, in the county and State of New York, have invented new and useful Improvements in Slop Jars or Vessels, of which the following is a specification.

This invention has for its object to provide a slop jar or vessel with a top or cover which will sit firmly on the jar, and at the same time allow the fluid to be poured into the jar without the risk of splashing or running over, as set forth in the following specification and claim, and illustrated in the accompanying drawings, in which—

Figure 1 is a vertical section of a jar and cover. Fig. 2 is a side elevation of a cover. Fig. 3 is a plan view of a cover.

Similar letters indicate corresponding parts.

In the drawings, the letter A indicates a bucket, vessel, or jar having a handle or bail, G. The top or cover has a bottom, B, provided with a hole at C. The supporting-flange E enables the bottom to rest on the top of the vessel A. Below the flange is a vertically-arranged rim portion, H, of the cover, made to snugly fit the side of the vessel or jar, so that said top will not be able to move laterally and will sit firmly on the jar. From the upper side of the flange E rises a vertically-arranged rim portion, F, having an annular rim, D, that extends inwardly and then downwardly to provide the internal pendent flange, D', which overhangs the bottom wall, B. By providing the rim D on the rim portion F with the internal pendent annular flange, D', I avoid spilling or splashing, since when fluid is poured violently onto the bottom B said fluid has its tendency to overflow first checked by striking against the vertical portion F, and then said fluid is caught by the inwardly-overhanging rim D and pendent flange D', and is thrown back onto the bottom B, whence it passes through the opening at C into the jar.

As seen in the drawings, the bottom B, vertically-arranged rim portion H, flange E, rim portion F, inwardly-projecting rim D, and internal pendent flange, D', can be made or stamped from one piece of metal, whereby a cheap and strong article is obtained.

What I claim as new, and desire to secure by Letters Patent, is—

A slop-jar cover consising of the centrally-apertured bottom wall, B, the vertical rim portion H, to closely fit the internal surface of a jar-mouth, the lateral flange E, to rest on the jar, and the vertical rim portion F, having the inwardly-projecting rim D, extended downward to form the internal annular pendent flange, D', overhanging the bottom wall, substantially as described.

In testimony whereof I have hereunto set my hand and seal in the presence of two subscribing winesses.

FREDERICK HABERMAN. [L. S.]

Witnesses:
 WILLIAM C. HAUFF,
 W. HAUFF.